United States Patent

[11] 3,617,371

| [72] | Inventor | Robert A. Burmeister, Jr. |
| --- | --- | --- |
| | | Los Altos, Calif. |
| [21] | Appl. No. | 775,396 |
| [22] | Filed | Nov. 13, 1968 |
| [45] | Patented | Nov. 2, 1971 |
| [73] | Assignee | Hewlett-Packard Company |
| | | Palo Alto, Calif. |

[54] METHOD AND MEANS FOR PRODUCING SEMICONDUCTOR MATERIAL
7 Claims, 1 Drawing Fig.

[52] U.S. Cl. .......................................... 117/201,
117/106, 23/204, 118/48, 118/49.5
[51] Int. Cl. ........................................ H01l 7/36,
B44d 1/02, B44d 1/18
[50] Field of Search .......................................... 117/201,
106 A; 23/204; 118/48, 49.5

[56] References Cited
UNITED STATES PATENTS

| 2,873,222 | 2/1959 | Derick et al. ................. | 117/106 X |
| 3,231,337 | 1/1966 | Barkemeyer et al. ......... | 23/277 |
| 3,346,414 | 10/1967 | Ellis et al. ...................... | 117/106 |
| 3,348,984 | 10/1967 | Pammer ......................... | 148/174 |
| 3,361,600 | 1/1968 | Reisman et al. ............... | 117/106 X |
| 3,394,390 | 7/1968 | Cheney ......................... | 23/204 |

Primary Examiner—William L. Jarvis
Attorney—A. C. Smith

ABSTRACT: A vertical vapor-phase reactor for growing semiconductor materials such as Group III-V compounds on suitable substrates includes at least three spaced chambers disposed within a susceptor which is inductively heated. Gases of selected composition flow downwardly through the reactor in separate streams. One or more gas streams flow through regions containing sources of elements which react with the gases, and another gas stream flows through the reactor in a manner which bypasses the source region. The gas streams are combined in a mixing region downstream of the source region and the mixture of gases is then passed over a heated substrate in a growing region downstream of the mixing region.

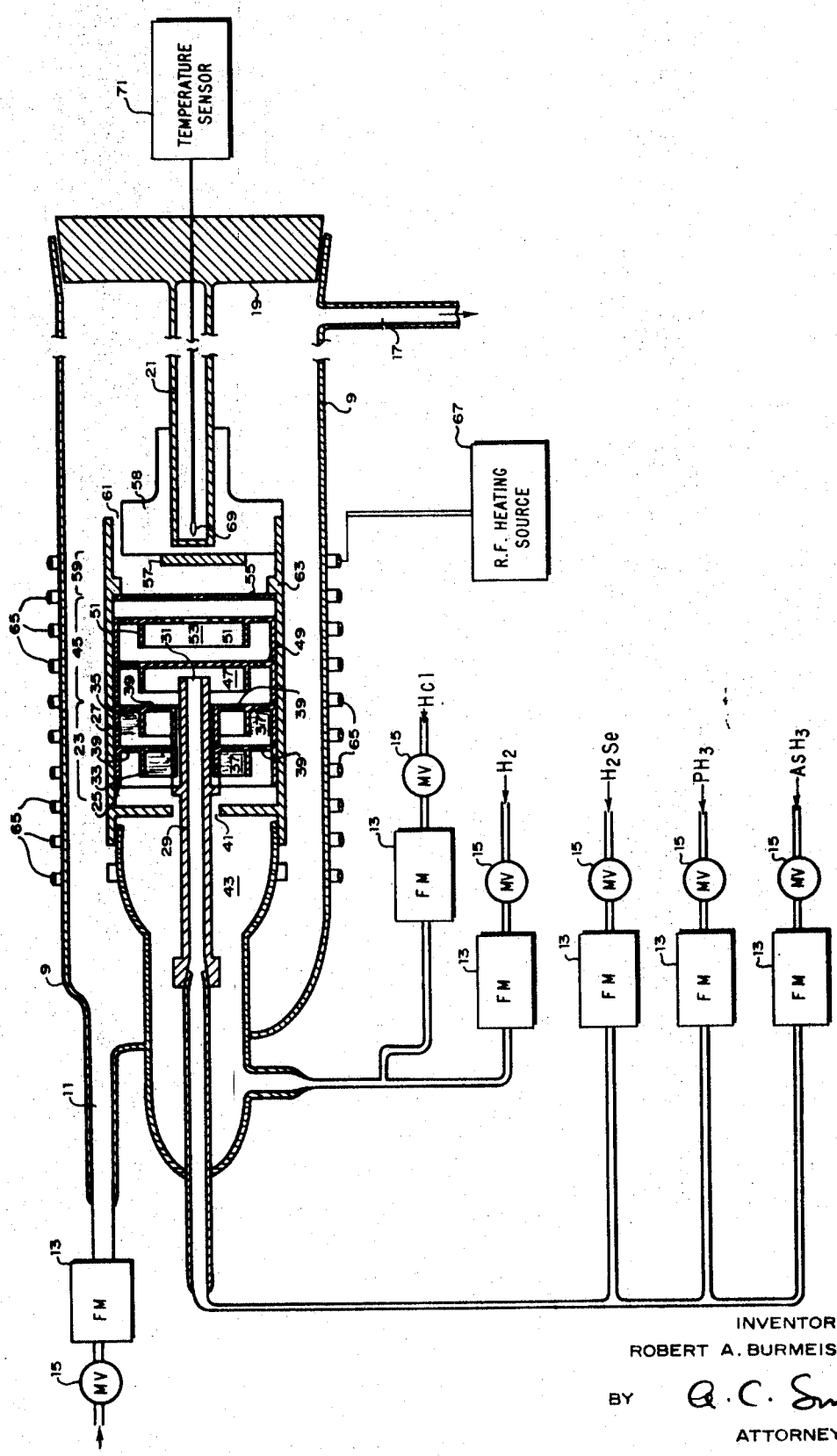

METHOD AND MEANS FOR PRODUCING SEMICONDUCTOR MATERIAL

BACKGROUND OF THE INVENTION

Certain known semiconductor reactors combine a plurality of gases and reactive materials in a single region and then expose a substrate to the reaction products so combined to form the desired semiconductor material on the substrate. Also, these known reactors use external heating means to elevate the temperature of internal portions of the reactor. This requires that the enclosing walls of the reactor, usually fused silica, be able to withstand high temperatures without reacting with the internal gases and without contaminating the internal atmosphere. Reactors of this type usually require undesirably long time periods for initially heating and finally cooling the reactor. Also, these conventional reactors usually have an undesirably long time constant associated with required changes in the gas phase composition. Reactors of this type also have the disadvantage that the walls of the vessel (which are typically fused silica) deteriorate at the high operating temperatures and tend to contaminate the internal atmosphere.

SUMMARY OF THE INVENTION

Accordingly, the vertical reactor of the present invention includes separately arranged source, mixing and growing chambers which may be selectively heated inductively to eliminate contaminating decomposition of the reactor walls.

The source chamber of the reactor is arranged upstream of the mixing and growing chambers to provide greater versatility and control of reaction products and to eliminate lag times in changing chemical composition of the semiconductor material being grown. Also, the inductive heating of the several chambers that comprise the present reactor allows the outer walls of the reactor to operate at much lower temperatures than conventional reactors, thereby eliminating a source of contamination of the internal atmosphere.

DESCRIPTION OF THE DRAWING AND PREFERRED EMBODIMENT

The drawing shows a simplified sectional view of the vertical reactor according to the preferred embodiment of the present invention.

The reactor includes an outer vessel 9 having an inlet 11 at the upper end that is coupled through suitable flow meter 13 and metering valve 15 to a source (not shown) of purging gas such as hydrogen or nitrogen. The outer vessel may be made of fused silica or other suitable electrically nonconductive refractory material of high purity. An outlet 17 at the lower end of the outer vessel 9 serves as a vent for exhaust gases during operation. It may also be connected to a suitable vacuum pump for initial evacuation, where desired. The reactor may be charged with the requisite materials or otherwise serviced through the lower end of vessel 9 which is then sealed by a base 19. The internal chambers of the reactor are retained in position on the supporting column 21 of fused silica which is attached to the base 19. These internal chambers are successively arranged along the downward-flowing gas streams that pass through the reactor. The uppermost chamber 23 includes a plurality of annular boats 25, 27 disposed about a central tube 29 that has an outlet 31 below or downstream of the boats 25, 27. Also, this uppermost chamber may be divided into two or more separate chambers containing separate reactants by providing one or more vertical septa through this portion of the reactor that forms the source chamber. More than one tube 29 may be centrally disposed through the source chamber to introduce selected gases directly into the mixing chamber. The boats 25, 27 alternately include inner and outer annular troughs 33, 35 for confining supplies of reactant material(s) 37 and include, respectively, outer gas passages 39. Gas is supplied to this source chamber 23 through a central aperture 41 around the tube 29 from the upper inner chamber 43. Gas from chamber 43 thus flows through the aperture 41, over the surface of reactant material 37 and through the gas passage 39 of boat 25, over the surface of reactant material 37 and through the gas passage of boat 27 into the mixing chamber 45. This gas flow through the source chamber thus remains isolated from the gas in tube 29 until both gases are combined downstream of the source chamber 23 in the mixing chamber 45. This separation of the gas streams assures that chemical composition of the resulting gas flow over the reactant material 37 may be changed rapidly simply by changing the composition or flow rate of the gas in chamber 43. Also, where the source chamber is divided into two or more separate source chambers, the gas flow through each of these separate source chambers remains isolated from the gas flow in other of the separate source chambers and from the gas in tube 29.

The mixing chamber 45 includes a plurality of annular baffles and passages which are so arranged that the gas flowing from outlet 31 of tube 29 combines with the gas flowing through passages 39 of the boat 27. The cup-shaped baffle 47 assures complete mixing of the gases in the two separate streams by virtue of the turbulent flow over the baffle and through the outer annular passages 49. Mixing continues as the gases flow radially inwardly over baffles 51 and through the inner annular passages 53. A perforated baffle 55 at the outlet of the mixing chamber 45 is provided to establish laminar flow of the mixed gases over the surface of a semiconductor substrate 57 supported on a pedestal 58 in the growth chamber 59. The residual gases flow out of the growth chamber 59 through passage 61 and out through the outlet 17.

The cylindrical walls 63 that enclose the chambers 23, 45 and 59 comprise an electrically conductive refractory material such as graphite. These conductive walls are electromagnetically coupled to the RF heating coils 65 which in turn are coupled to a source 67 of RF power. The internal walls 63 are thus induction heated in a known manner in response to RF power applied to coils 65 without heating the outer walls (typically formed of fused silica). Substantially all the radiation from the walls 63 pass through the fused silica vessel 9 without elevating the temperature thereof appreciably. As a result, the outer vessel 9 operates relatively cooly while the elements which form the chambers 23, 45 and 59 and which are disposed within the walls 63 all thermally equilibrate to substantially the operating temperatures of the adjacent portions of the walls 63. The RF heating coils 65 may be nonlinearly disposed along the length of the walls or the RF power applied to individual coils 65 may be varied to concentrate the heating power at selected portions of the length of walls 63. In practice, for the specific case of the growth of $GaAs_{1-x}P_x$ alloys, the upper portion adjacent the source chamber 23 operates at approximately 850° C., the portion adjacent the mixing chamber 45 operates at approximately 800° C. and the lower portion adjacent the growing chamber 59 operates at approximately 750° C. The term "approximately" as used herein is intended to include values within ±10 percent of the stated values. The boats 25, 27, the baffles 47, 51 and 55 and the pedestal 58 may all be formed of graphite to eliminate a source of contamination. Also, the electrical conductivity of these elements may assist in heating the internal structure in response to the electromagnetic field produced by the coils 65. However, the "skin depth" of circulating currents induced by the electromagnetic field of coils 65 is almost entirely contained within the thickness of the conductive graphite walls 63. A thermocouple 69 may be positioned within the support column 21 closely adjacent the position of a substrate 57 on the upper surface of pedestal 58 for accurately determining the temperature of the substrate. Temperature-sensing means 71 may be connected to the thermocouple 69 for giving a temperature indication or for controlling the RF power from source 67 where desired to maintain close control of the operating temperature.

Various chemical reactions may be carried on in the present reactor and the following description by way of example only relates to operation of the reactor for vapor-phase growth of gallium arsenide phosphide epitaxial layers on gallium arsenide substrates. The gallium (Ga) in sources 37 is transported to the substrate 57 by the GaCL-GaCL₃ reaction and any one of several combinations of reactants, as shown in the following table, may be used in this vapor-phase reaction.

| Ga source | As source | P source | Transport agent |
|---|---|---|---|
| Ga | As | P | HCl |
| Ga (As and P saturated) | AsCl₃ | PCl₃ | AsCl₃ |
| GaAs | AsH₃ | PH₃ | PCl₃ |
| GaP | GaAs | GaP | |

The particular combination of reactants found to be conveniently useful are gallium (contained within boats 25, 27), arsine (AsH₃ supplied through manifold 73 to tube 29), phosphine (PH₃ supplied through manifold 73 to tube 29) and hydrogen chloride (HCL supplied to chamber 43). An n-type dopant such as selenium (Se) may be introduced in the form of hydrogen selenide (H₂Se supplied through manifold 73 to tube 29) and p-type dopants such as zinc may be introduced in the form of diethyl zinc ((C₂H5)₂Zn).

In the present reactor, the gallium 37 (or gallium arsenide or gallium phosphide) contained within the heated boats 25, 27 reacts with HCl entering the reactor from chamber 43 to form GaCl. This reaction product is mixed downstream of the gallium source with the Group V element and any dopant introduced in vapor phase through tube 29. The mixture of gases then flows over the heated gallium arsenide substrate 57 disposed downstream of the mixing chamber 45. Gallium arsenide phosphide deposits on the gallium arsenide substrate according to the following reaction equation:

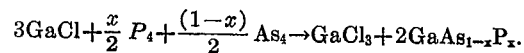

The vapor-phase sources of arsenic and phosphorus are thus controlled to the desired flow rates by suitable metering valves 15 and flow meters 13 to yield the desired value of $x$ in $GaAs_{1-x}P_x$. The flow rates may be altered selectively without suffering any significant chemical lag in the transition, for example to graduate the composition of the deposited layer from gallium arsenide of the substrate to the desired value of $GaAs_{1-x}P_x$.

As another example, the present reactor may also be used to grow an epitaxial layer of gallium indium phosphide on a suitable substrate such as gallium arsenide. In this example, the source chamber may conveniently be divided into separate, semicircular sections by a vertical septum with a separate source of transport gas such as hydrogen chloride coupled to each section. Each section may then contain separate supplies of gallium and indium and the reaction products therefrom may be combined in the mixing chamber with phosphine gas (or other gas containing phosphorus) introduced through tube 29. This gas combined with the reaction products from the separate sources of indium and gallium may then be passed over a substrate such as a gallium arsenide wafer disposed on pedestal 58 for forming as an epitaxial layer thereon the desired layer of gallium indium phosphide.

What I claim:

1. Apparatus for producing compound materials comprising:
   a. vertically disposed substantially cylindrical reactor including a substantially concentric source chamber for containing a supply of at least a first reactant;
   gas supply means communicating with the source chamber for introducing a reaction gas flowing only over the surface of said first reactant to provide a reaction product downstream of said source chamber;
   a substantially concentric mixing chamber in said reactor disposed downstream of said source chamber for receiving the reaction product therefrom;
   source means including a conduit substantially concentrically disposed through the source chamber of the reactor and having an outlet substantially concentrically disposed downstream of said source chamber for introducing a second reactant into the mixing chamber of said reactor to combine the second reactant with the reaction product from said source chamber downstream of said source chamber in said mixing chamber;
   a growing chamber in said reactor disposed downstream of said mixing chamber and including means for supporting a substrate substantially concentrically therein to receive the combined reaction product and second reactant to produce the desired compound material on said substrate;
   heating means including an electrically conductive refractory element substantially concentrically surrounding selected ones of said chambers in said reactor and including radio frequency induction coils disposed about said refractory element for heating the same in response to radio frequency power applied to said coils.

2. Apparatus as in claim 1 comprising:
   outer conduit means of electrically nonconductive material disposed between the radio frequency induction heating coils and the refractory element of said heating means to enclose the refractory element for providing a fluid conduit thereabout.

3. Apparatus for producing compound materials as in claim 1 wherein:
   said gas supply means introduces the first reactant including at least one Group III element; and
   said source means introduces the second reactant including at least one Group V element.

4. Apparatus as in claim 3 wherein:
   said source means introduces the second reactant also including an element selected from Group II and Group VI.

5. In the process of making compound materials by vapor phase reaction, the steps of:
   passing a first reaction gas in a first gas stream flowing substantially radially over only the surface of a source containing at least one Group III element;
   passing a second reaction gas containing at least one Group V element through the region of said source in a second gas stream which is disposed substantially symmetrically with respect to the radial flow of the first gas stream and in fluid isolation from said first gas stream;
   combining the first and second gas streams along substantially symmetrical radial flow paths in a region downstream of the source; and
   passing the combined first and second gas streams over s substrate disposed downstream of the region in which the first and second gas streams are combined.

6. The process of claim 5 wherein the second reaction gas stream containing the Group V element also includes a dopant element selected from Group II and Group IV.

7. The process of claim 5 comprising the steps of:
   passing a third reaction gas in a third gas stream over the surface of a source that includes indium; and
   combining the first, second and third gas streams in a region downstream of the source of gallium and of the source of indium where the second reaction gas includes phosphorus.

* * * * *

UNITED STATES PATENT OFFICE
CERTIFICATE OF CORRECTION

Patent No. 3,617,371                  Dated November 2, 1971

Inventor(s) Robert A. Burmeister, Jr.

It is certified that error appears in the above-identified patent and that said Letters Patent are hereby corrected as shown below:

Column 1, line 71, after "outer" insert -- and inner --;

Column 3, line 2, "GaCL-GaCL$_3$" should read -- GaCl-GaCl$_3$ --; line 17, "HCL" should read -- HCl --; line 21, "((C$_2$H5)$_2$Zn)" should read -- ((C$_2$H$_5$)$_2$Zn) --; line 38, "GaAs$_{11x}$P" should read -- GaAs$_{1-x}$P$_x$ --; line 42, "GaAs$_{11x}$P" should read -- GaAs$_{1-x}$P$_x$ --;

Column 4, line 53, "s" should read -- a --.

Signed and sealed this 25th day of April 1972.

(SEAL)
Attest:

EDWARD M. FLETCHER, JR.
Attesting Officer

ROBERT GOTTSCHALK
Commissioner of Patents